United States Patent
Kypri (10) Patent No.: US 9,685,098 B1
(45) Date of Patent: Jun. 20, 2017

(54) DRIVER COMPLIANCE RISK ADJUSTMENTS

(71) Applicant: Lytx, Inc., San Diego, CA (US)

(72) Inventor: Niki Kypri, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/814,253

(22) Filed: Jul. 30, 2015

(51) Int. Cl.
| | | |
|---|---|---|
| *G01M 17/00* | (2006.01) | |
| *G06F 7/00* | (2006.01) | |
| *G06F 19/00* | (2011.01) | |
| *G09B 19/16* | (2006.01) | |
| *G06Q 50/26* | (2012.01) | |
| *G07C 5/08* | (2006.01) | |
| *B60W 40/09* | (2012.01) | |

(52) U.S. Cl.
CPC ......... *G09B 19/167* (2013.01); *G06Q 50/265* (2013.01); *G07C 5/0808* (2013.01); *B60W 40/09* (2013.01); *G07C 5/08* (2013.01)

(58) Field of Classification Search
CPC ........ G07C 5/08; G07C 5/0841; G07C 11/00; G07C 5/0808; G06K 2009/00738; G09B 17/167; B60W 40/09

USPC .......................................................... 701/33.4
See application file for complete search history.

(56) References Cited

U.S. PATENT DOCUMENTS

| | | | |
|---|---|---|---|
| 8,930,072 B1 * | 1/2015 | Lambert ............... | G07C 5/0866 348/222.1 |
| 2014/0306826 A1 * | 10/2014 | Ricci ..................... | H04W 48/04 340/573.1 |
| 2015/0375756 A1 * | 12/2015 | Do ......................... | B60W 50/14 701/1 |
| 2016/0050356 A1 * | 2/2016 | Nalepka ............. | H04N 5/23203 348/148 |

* cited by examiner

*Primary Examiner* — Isaac Smith
(74) *Attorney, Agent, or Firm* — Van Pelt, Yi & James LLP (57) ABSTRACT

A system for driver compliance risk adjustments includes an interface and a processor. The interface is to receive driver violation data. The processor is to determine risk based at least in part on the driver violation data and provide an event recorder one or more risk adjustments based at least in part on the risk.

21 Claims, 7 Drawing Sheets

Driver Log Entry

| John | Smith | 13579 | /John Smith/ |
|---|---|---|---|
| Driver First Name | Driver Last Name | Driver Identifier | I Certify These Entries Are True |

|  | Total |
|---|---|
| Off Duty | 5.25 |
| SL Berth | 11.00 |
| Driving | 6.25 |
| On Duty (Not Driving) | 1.50 |

| April 19, 2015 | 34864 | 832083 | 321 | 57.75 |
|---|---|---|---|---|
| Date | Tractor # | Trailer # | Total Mileage Driven Today | 7 day Total |

[X] I detect no defects or deficiencies in this motor vehicle as would be likely to affect the safety of its operation or result in its mechanical breakdown

[ ] I detect the following defects or deficiencies in this motor vehicle as would be likely to affect the safety of its operation or result in its mechanical breakdown

DRIVER COMPLIANCE RISK ADJUSTMENTS

BACKGROUND OF THE INVENTION

Event recorder systems monitor sensors that measure vehicles being driven. Events are recorded based on whether sensor data is outside of a normal profile. However, the determining of a normal profile is often independent of data that is measured by the event recorder.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for driver compliance risk adjustment is disclosed. The system comprises an interface and a processor. The interface is to receive a driver violation data. The processor is to determine a risk based at least in part on the driver violation data and to provide an event recorder one or more risk adjustments based at least in part on the risk. In some embodiments, a memory is coupled to the processor and configured to provide the processor with instructions.

In some embodiments, a system for driver compliance risk adjustment comprises a system that receives vehicle event data. For example, the system receives data from a vehicle event recorder. In various embodiments, data from a vehicle event recorder comprises vehicle event recorder sensor data, vehicle event recorder processed data, vehicle event recorder instrument data, vehicle data, vehicle sensor data, collision data, or any other appropriate data. The system receives data from a compliance system. In various embodiments, data from a compliance system comprises hours of service data, hours of service log, maintenance record data, maintenance record log, violation data, collision data, collision log, driver data, or any other compliance data. The system processes vehicle event data and compliance data. For example, the vehicle event data and the compliance data are processed to provide useful input signals for data analysis. In various embodiments, processing includes filtering, averaging, windowing, correlating, or any other appropriate processing. The system analyzes collision risk. For example, for time up to collisions and for time up to no collision, vehicle event data and compliance data are examined to determine patterns that correlate with increased risk of collision and/or patterns that correlate with decreased risk of collision. The system determines whether thresholds are to be adjusted. For example, thresholds for flagging data to be an event in an event recorder. In some embodiments, the thresholds correspond to one or more data that are gathered by an event recorder (e.g., from sensors). In the event that thresholds are to be adjusted, determine thresholds and provide to vehicle event recorder. The changed thresholds indicate events for which data is stored and later transmitted back to an event server. The data is stored by the event server or by a database coupled to the event server. The data are used to determine risk and the data are used for coaching of drivers for avoiding collisions.

In some embodiments, near collisions are used for determining near collision risk, and thresholds are adjusted to take event data for near collisions (e.g., with steps similar to the steps above for adjusting thresholds for collisions above).

Figure 1:
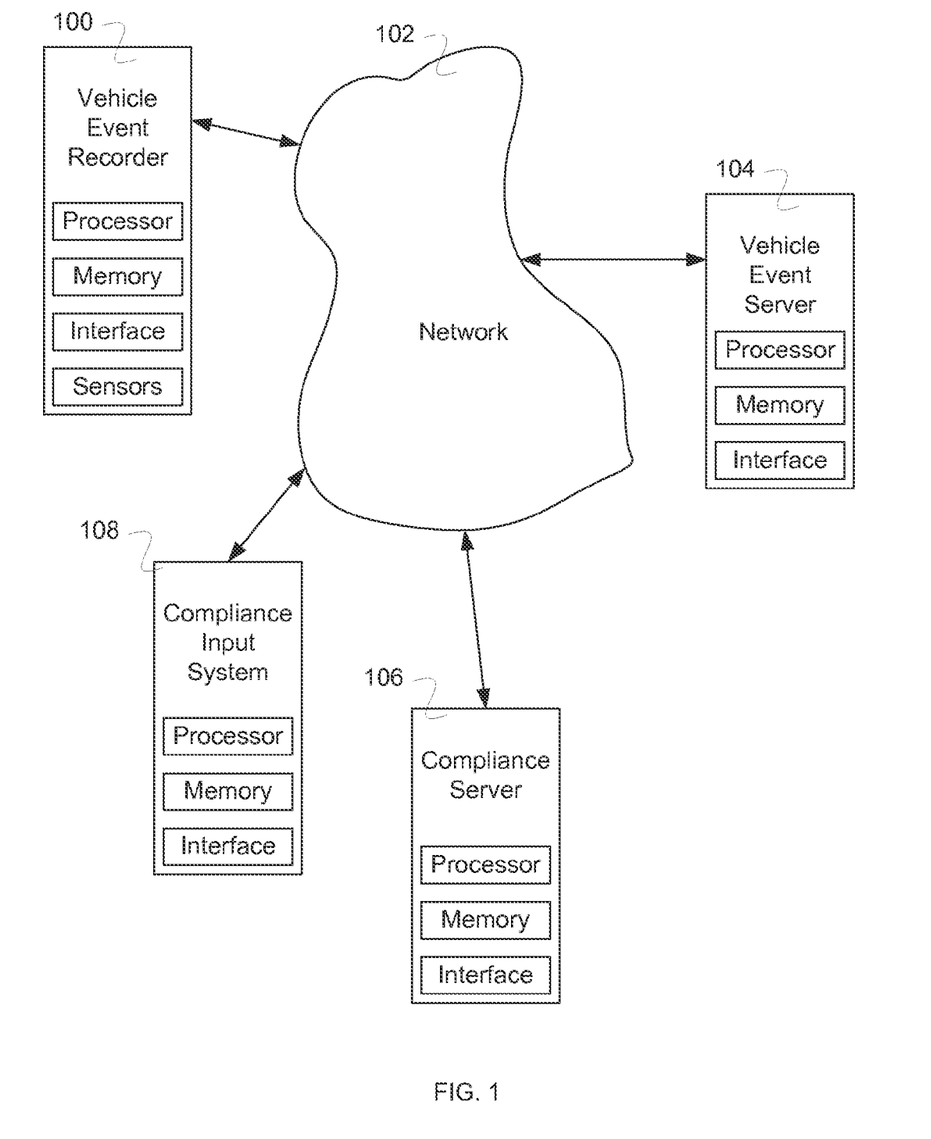
FIG. 1 is a block diagram illustrating an embodiment of a system for driver compliance risk adjustment.

FIG. 1 is a block diagram illustrating an embodiment of a system for driver compliance risk adjustment. In the example shown, vehicle event recorder 100 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 100 comprises a system for processing sensor data and detecting events. In some embodiments, vehicle event recorder 100 comprises a system for detecting risky behavior. In various embodiments, vehicle event recorder 100 is mounted on a vehicle in one of the following locations: the chassis, the front grill, the dashboard, the rear-view mirror, or any other appropriate location. In some embodiments, vehicle event recorder 100 comprises multiple units mounted in different locations in a vehicle. In some embodiments, vehicle event recorder 100 comprises a communications system for communicating with network 102. In various embodiments, network 102 comprises a wireless network, a wired network, a cellular network, a code division multiple access (CDMA) network, a global systems for mobile communication (GSM) network, a local area network, a wide area network, the Internet, a 4G Long Term Evolution (LTE) network, a Universal Mobile Telecommunications system (UMTS), a Worldwide Interoperability for Microwave Access (WiMax) system, a Dedicated Short-Range Communication (DSRC) system, or any other appropriate network. In some embodiments, network 102 comprises multiple networks, changing over time and location. In some embodiments, different networks comprising network 102 comprise different bandwidth cost (e.g., a wired network has a very low cost, a wireless Ethernet connection has a moderate cost, a cellular data network has a high cost). In some embodiments, network 102 has a different cost at different times (e.g., a higher cost during the day and a lower cost at night).

In some embodiments, vehicle event recorder 100 communicates with vehicle event server 104 via network 102. Vehicle event recorder 100 is mounted to a vehicle. In various embodiments, the vehicle comprises a car, a truck, a commercial vehicle, or any other appropriate vehicle. Vehicle event server 104 comprises a vehicle event server for collecting events and risky behavior detected by vehicle event recorder 100. In some embodiments, vehicle event server 104 comprises a system for collecting data from multiple vehicle event recorders. In some embodiments, vehicle event server 104 comprises a system for analyzing vehicle event recorder data and compliance data. In some embodiments, vehicle event server 104 comprises a system for displaying vehicle event recorder data. In some embodiments, vehicle event server 104 is located at a home station (e.g., a shipping company office, a taxi dispatcher, a truck depot, etc.). In some embodiments, events recorded by vehicle event recorder 100 are downloaded to vehicle event server 104 when the vehicle arrives at the home station. In some embodiments, vehicle event server 104 is located at a remote location. In some embodiments, events recorded by vehicle event recorder 100 are downloaded to vehicle event server 104 wirelessly. In some embodiments, a subset of events recorded by vehicle event recorder 100 are downloaded to vehicle event server 104 wirelessly. In some embodiments, vehicle event recorder 100 comprises a processor, a memory, an interface, and sensors. In some embodiments, vehicle event server 104 comprises a processor, a memory, and an interface. In some embodiments, vehicle event server 104 comprises a cloud based server. In some embodiments, vehicle event server 104 comprises multiple servers (e.g., one server at a place of business location and one server at a cloud based server).

In some embodiments, compliance input system 108 comprises a processor, a memory, and an interface. Compliance input system 108 comprises an input device (e.g., a computer, a laptop, a tablet, a smart phone, etc.) that allows a user to input compliance data (e.g., hours of service log, maintenance log, driver data, violations, etc.). In various embodiments, input to compliance input system 108 comes from one or more of the following: a $3^{rd}$ party API, a paper log processing system, an Electronic Logging Device (ELD), an electronic on board recorder (EOBR), or any other appropriate source for data. Compliance data is gathered from a plurality of vehicles and stored on compliance server 106. Compliance server 106 comprises a processor, a memory (e.g., a database), and an interface.

Figure 2:
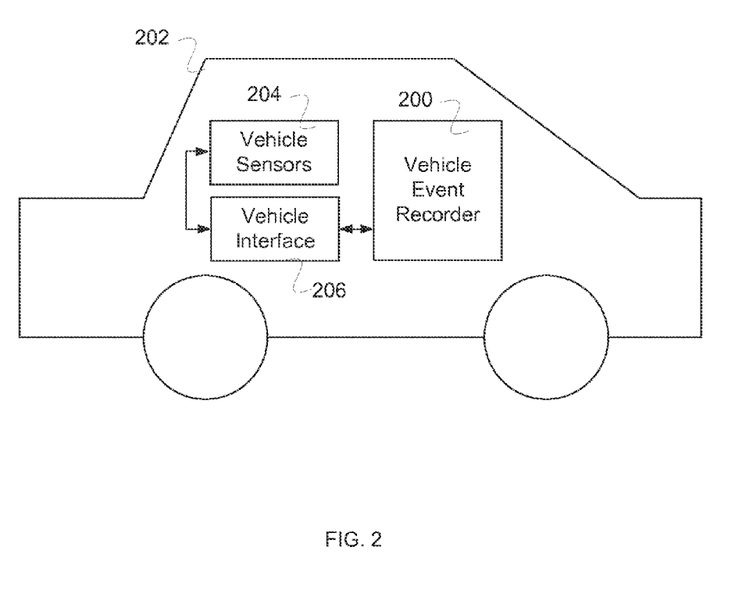
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 100 of FIG. 1. In the example shown, vehicle event recorder 200 comprises a processor. Processor comprises a processor for controlling the operations of vehicle event recorder 200, for reading and writing information on a data storage memory, for communicating via a wireless communications interface, and for reading data via a sensor interface. Data storage comprises a data storage (e.g., a random access memory (RAM), a read only memory (ROM), a nonvolatile memory, a flash memory, a hard disk, or any other appropriate data storage). In various embodiments, data storage comprises a data storage for storing instructions for processor, vehicle event recorder data, vehicle event data, sensor data, video data, driver scores, or any other appropriate data. In various embodiments, communications interfaces comprises one or more of a global systems for mobile communication (GSM) interface, a code division multiple access (CDMA) interface, a WiFi interface, an Ethernet interface, a USB interface, a Bluetooth interface, an Internet interface, LTE, UMTS, WiMax, DSRC, or any other appropriate interface. Sensor interface comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, or any other appropriate sensors. In some embodiments, vehicle event recorder 200 communicates with vehicle sensors 204 using vehicle interface 206. In various embodiments, vehicle sensors comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In various embodiments, vehicle interface 206 comprises an on-board diagnostics (OBD) bus or J1939 that includes OBD plus additional sensors. In some embodiments, vehicle event recorder 200 communicates with vehicle sensors via OBD bus.

Figure 3:
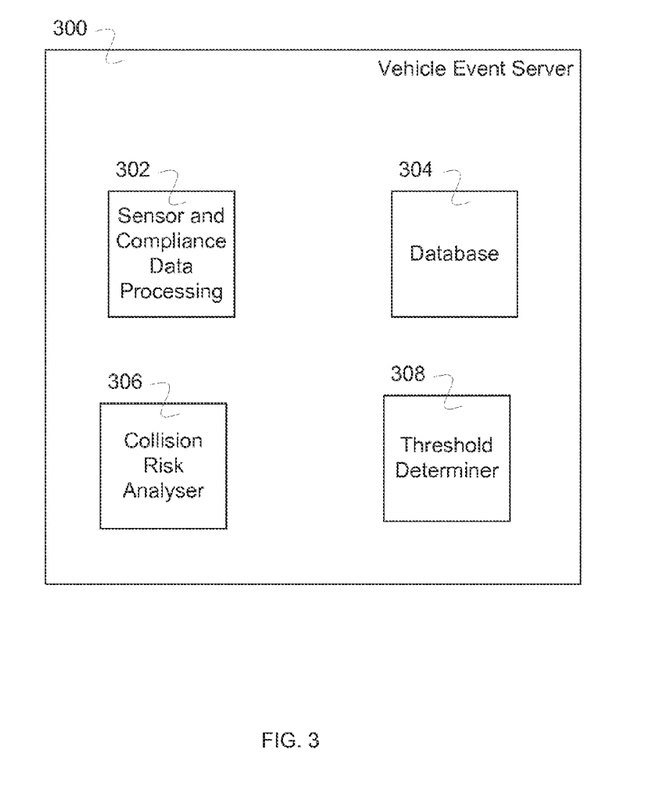
FIG. 3 is a block diagram illustrating an embodiment of a vehicle event server.

FIG. 3 is a block diagram illustrating an embodiment of a vehicle event server. In some embodiments, vehicle event server 300 comprises vehicle event server 104 of FIG. 1. In the example shown, vehicle event server 300 comprises sensor and compliance data processing 302, database 304, collision risk analyzer 306, and threshold determiner 308. Sensor and compliance data processing 302 processes input data from sensors and compliance systems for collision risk 306. In various embodiments, processing of input data comprises averaging, filtering, smoothing, correlating, bucketing, data transformation (e.g., taking the log of a variable), data cleansing (e.g., removal of outliers), derivation of a new variable from other input variables (e.g., 30-min break violation per miles driven or hours driven over a period of time, where "30-min break violation" and "miles driven" are two separate variables that are combined together to derive a new variable), or any other appropriate processing. Database 304 stores sensor and compliance data as well as collision data, event data, driver data, vehicle data, or any other appropriate data. Collision risk analyzer 306 analyzes data stored in database 304 (e.g., as processed by sensor and collision risk 306, event data, sensor data, etc.) to determine collision risk associated with a driver. Threshold determiner 308 determines thresholds for event detection to be used by an event recorder based on the collision risk associated with the driver driving a vehicle with the event recorder. In some embodiments, events are triggered by determining different probabilities of an event based on thresholds to decide whether an event should be captured. In some embodiments, probability of an event is determined using a neural net.

Figure 4:
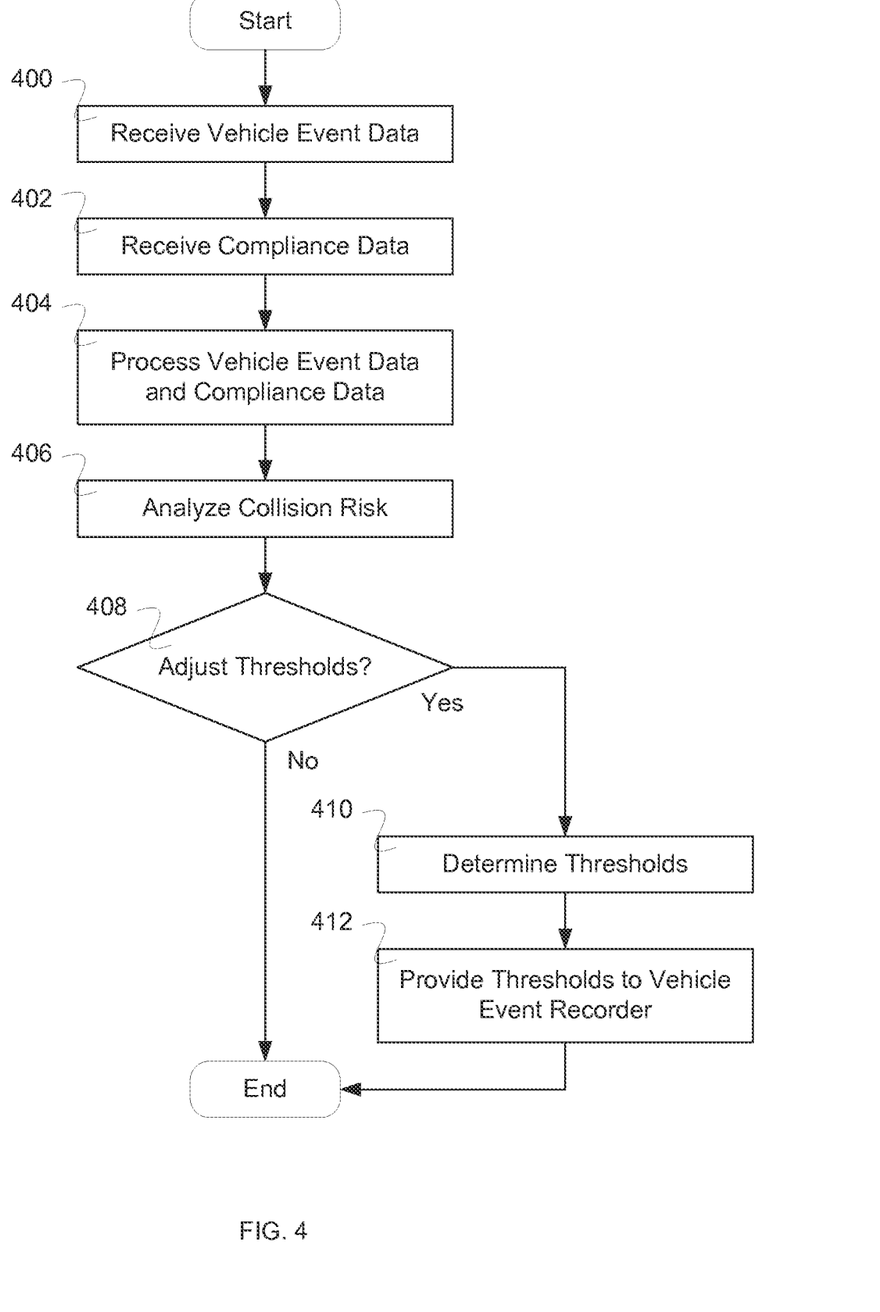
FIG. 4 is a flow diagram illustrating an embodiment of a process for determining driver compliance risk.

FIG. 4 is a flow diagram illustrating an embodiment of a process for determining driver compliance risk. In some embodiments, the process of FIG. 4 is executed on vehicle event server 104 of FIG. 1. In the example shown, in 400 vehicle event data is received. For example, data from vehicle event recorder is received and stored on a vehicle event server. In 402, compliance data is received. For example, compliance data is received and stored on a vehicle event server from a compliance server. In 404, vehicle event data and compliance data is processed. In various embodiments, processing includes one or more of the following: averaging, summing, determining time weighted behaviors, windowing, or any other appropriate processing. For example, the processing comprises determining a number of brakings in the last 30 days versus 60 days, determining falling asleep behavior coupled with hours of service violations, determining an average number of 30 minute break violations per time driven, or any other appropriate processing. In 406, collision risk is analyzed. For example, correlating factors are determined associated with collision that are not associated with non-collision (e.g., an increase in excessive braking along with an increase of hours of service violations, any advanced driver assistance system (ADAS) signal(s) (e.g., lane departure signal, forward collision warning signal, etc.) coupled with hours of service violations, etc.). In 408, it is determined whether thresholds are to be adjusted. In the event that threshold are not to be adjusted, then the process ends. In the event that the thresholds are to be adjusted, then in 410 thresholds are determined. In some embodiments, threshold adjustments are determined associated with current vehicle a driver is driving. In 412, thresholds are provided to vehicle event recorder, and the process ends. For example, threshold are provided to a vehicle associated with a driver (e.g., the vehicle that the driver is driving currently even if different from prior vehicles). In some embodiments, thresholds are adjusted to increase sensitivity of event flagging in the event that a driver has higher risk of a collision. In some embodiments, thresholds are adjusted to decrease sensitivity of event flagging in the event that a driver has a lower risk of a collision.

Figure 5:
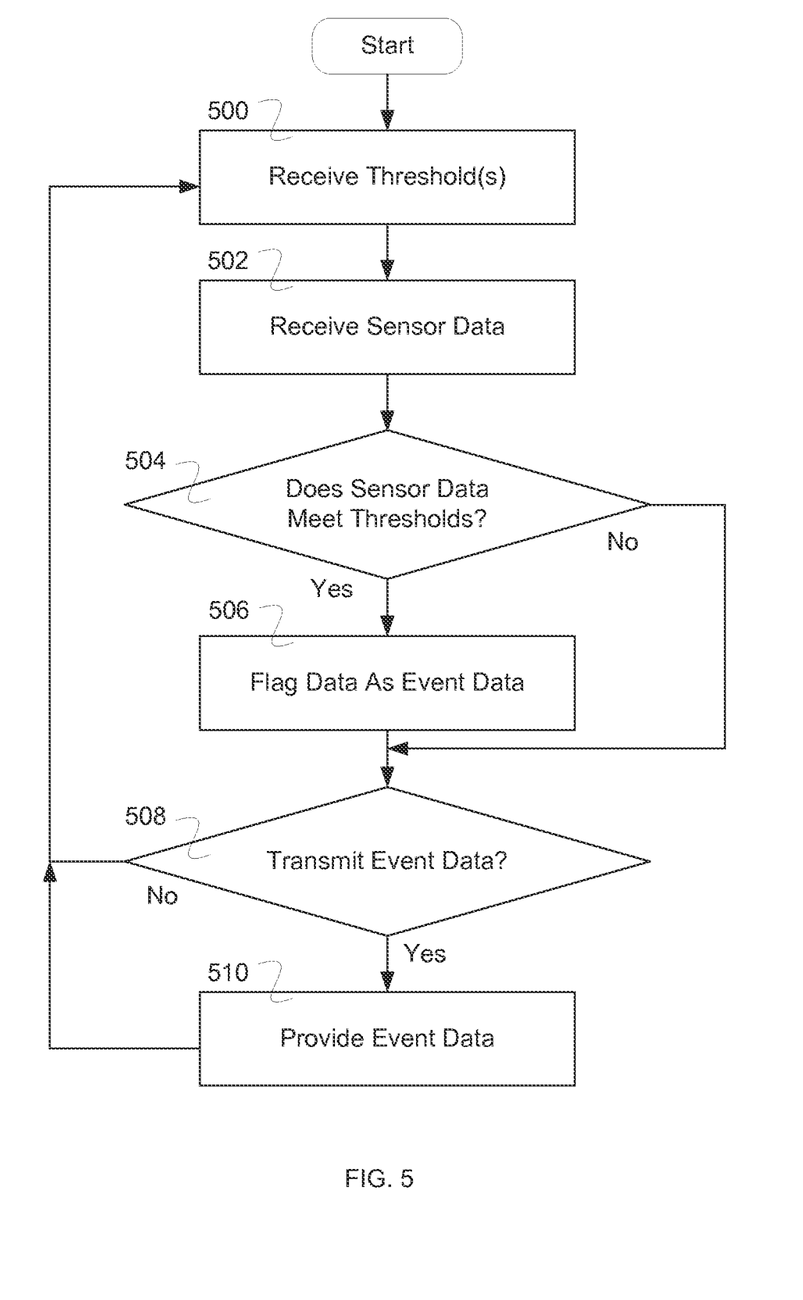
FIG. 5 is a flow diagram illustrating an embodiment of a process for an event recorder.

FIG. 5 is a flow diagram illustrating an embodiment of a process for an event recorder. In some embodiments, the process of FIG. 5 is executed on a vehicle event recorder (e.g., vehicle event recorder 100 of FIG. 1). In the example shown, in 500 threshold(s) is/are received. In 502, sensor data is received. In 504, it is determined whether sensor data meets thresholds. In the event that sensor data does not meet thresholds control passes to 508. In the event that sensor data meets thresholds, then in 506 data is flagged as event data. In 508, it is determined whether event data is to be transmitted. For example, a vehicle event recorder determines whether it is time to upload data to a server. In the event that event data is not to be transmitted, control passes to 500. In the event that event data is to be transmitted, then in 510 event data is provided. For example, event data is provided to a server by transmitting the data via a network (e.g., wireless network, cellular network, etc.) to a server.

In some embodiments, raw data is stored by the event recorder and processed later by an event server based at least in part on threshold(s) to determine events.

Figure 6:
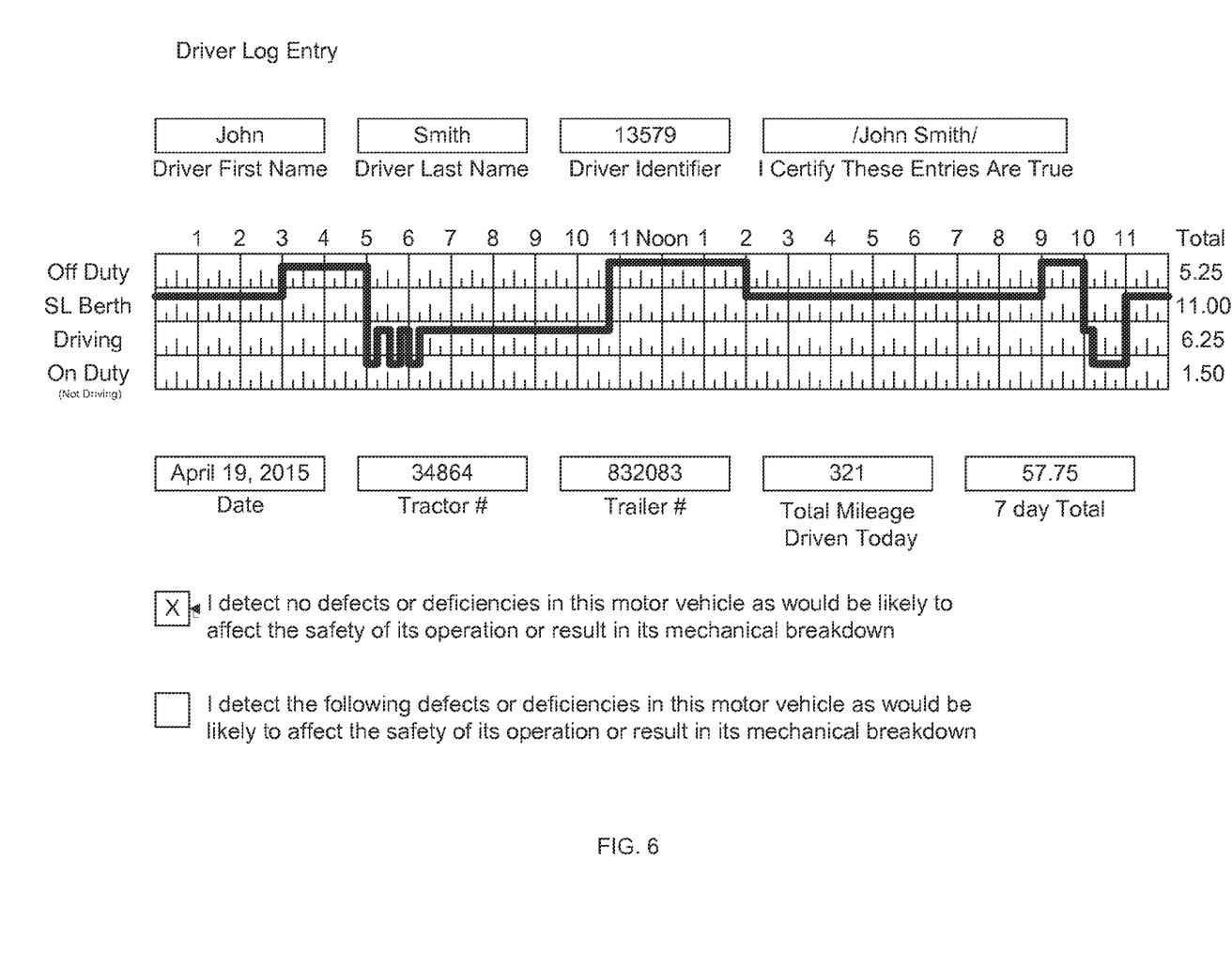
FIG. 6 is diagram illustrating an embodiment of driver log entry data.

FIG. 6 is diagram illustrating an embodiment of driver log entry data. In some embodiments, driver log entry data comprises compliance data (e.g., hours of service data). In the example shown, driver log entry data includes driver information (e.g., first name, last name, identifier, and signature certifying truth of entries, etc.). Driver log entry includes hours in different states (e.g., hours off duty, hours in sleeping berth, hours driving, hours on duty but not driving, total hours of each, etc.). In some embodiments, hours in different states are presented or input graphically. Driver log entry includes data information, vehicle identifiers (e.g., tractor number, trailer number, etc.), total number of miles driven, and 7 day total hours driven. In some embodiments, driver log entry includes statement regarding detection of defects (e.g., a check box for detecting or not detecting defects). In some embodiments, in the event that a check box is checked for defects detected, more data is entered by a user with details of defect and corrective measures to be pursued or to be scheduled or already performed.

Figure 7:
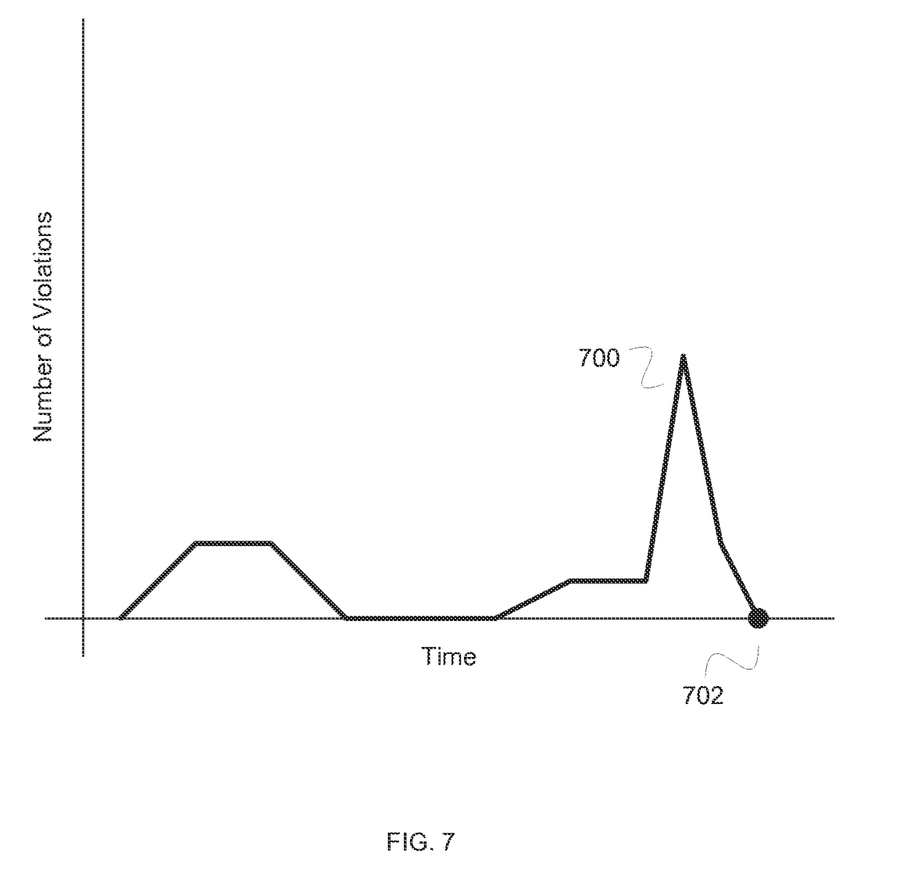
FIG. 7 is a graph illustrating an embodiment of a number violations over time.

FIG. 7 is a graph illustrating an embodiment of a number violations over time. In the example shown, violations are aggregated and graphed over time. The violations for a driver have a sharp increase (see 700) prior to a collision event (702). In some embodiments, a sharp increase in the number of violations is correlated with increased risk for collision and after this sharp increase is detected thresholds are lowered for event gathering for a vehicle event recorder associated with the driver. In some embodiments, long periods of no violations is correlated with non-collision and after a sufficient time, thresholds are increase for event gathering for a vehicle event recorder associated with the driver. In some embodiments, a profile of driver violations is compared to a determined profile of driver violations prior to a collision and this determined risk associated with driver. In various embodiments, other data is profiled prior to a collision to determine risk—for example, hours of service, maintenance, or any other appropriate data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for determining driver compliance risk adjustments, comprising:
   an event recorder configured to collect sensor data;
   an interface to:
      receive driver violation data, wherein the driver violation data includes data usable to determine whether at least one violation has occurred;
   a processor to:
      determine collision risk based at least in part on the driver violation data;
      provide the event recorder with one or more compliance risk adjustments based at least in part on the determined collision risk;
      receive sensor data from the event recorder; and mark received sensor data as event data based on the sensor data meeting the one or more compliance risk adjustments.

2. The system of claim 1, wherein the driver violation data comprises data associated with at least one of: maintenance of a vehicle with which the driver violation data is associated, compliance with legal regulations, a work schedule of a driver, and working characteristics of a driver.

3. The system of claim 1, wherein the driver violation data comprises an hours of service log.

4. The system of claim 1, wherein the driver violation data comprises a maintenance log.

5. The system of claim 1, wherein the interface is to receive a maintenance log.

6. The system of claim 5, wherein the processor is to determine the collision risk based at least in part on the maintenance log.

7. The system of claim 1, wherein the interface is to receive collision data.

8. The system of claim 7, wherein the processor is to determine the collision risk based at least in part on the collision data.

9. The system of claim 8, wherein determining risk is based at least in part on a profile of database driver violation data, the profile being associated with at least one event occurring prior to a collision.

10. The system of claim 9, wherein determining risk comprises determining similarity between driver violation data to the profile of database driver violation data prior to the collision.

11. The system of claim 8, wherein determining risk is based at least in part on a profile of database driver violation data prior to an event, wherein the event is not a collision.

12. The system of claim 1, wherein an adjustment of the one or more adjustments comprises a threshold adjustment.

13. The system of claim 12, wherein the threshold adjustment increases sensitivity of event detection for the event recorder.

14. The system of claim 12, wherein the threshold adjustment decreases sensitivity of event detection for the event recorder.

15. The system of claim 12, wherein the threshold adjustment increases sensitivity of event detection.

16. The system of claim 12, wherein the threshold adjustment decreases sensitivity of event detection.

17. The system of claim 1, wherein the driver violation data is associated with a specific driver.

18. The system of claim 17, wherein the event recorder is associated with a vehicle being driven by the driver.

19. A method of determining driver compliance risk adjustments, comprising:
    collecting, using an event recorder, sensor data;
    receiving driver violation data, wherein the driver violation data includes data usable to determine whether at least one violation has occurred;
    determining, using a processor, collision risk based at least in part on the driver violation data;
    providing the event recorder with one or more compliance risk adjustments based at least in part on the determined collision risk;
    receiving, from the event recorder, the sensor data; and
    marking, using the processor, received sensor data as event data based on the sensor data meeting the one or more compliance risk adjustments.

20. A computer program product for determining driver compliance risk adjustments, the computer program product being embodied in a non-transitory computer readable storage medium and comprising computer instructions for:
    collecting, using an event recorder, sensor data;
    receiving driver violation data, wherein the driver violation data includes data usable to determine whether at least one violation has occurred;
    determining collision risk based at least in part on the driver violation data;
    providing the event recorder with one or more compliance risk adjustments based at least in part on the determined collision risk;
    receiving sensor data; and
    marking received sensor data as event data based on the sensor data meeting the one or more compliance risk adjustments.

21. The method of claim 19, wherein the driver violation data includes an aggregation of vehicle event data and compliance data and the collision risk is determined based on the aggregation.

* * * * *